United States Patent [19]
Kamiya

[11] 3,887,979
[45] June 10, 1975

[54] MANUFACTURING PROCESS OF A ROLLED GEAR

[76] Inventor: Minoru Kamiya, 2-46-3 Minami Otsuka, Tokyo, Japan

[22] Filed: July 1, 1974

[21] Appl. No.: 484,754

[30] Foreign Application Priority Data
Mar. 6, 1974   Japan............................. 49-025912

[52] U.S. Cl.................................. 29/159.2; 72/70
[51] Int. Cl..... B21h 5/00; B23p 15/14; B29d 15/00
[58] Field of Search............ 29/159 R, 159.2; 72/70, 72/362, 365

[56] References Cited
UNITED STATES PATENTS
| | | | |
|---|---|---|---|
| 1,926,628 | 9/1933 | Morehouse | 29/454 |
| 3,273,366 | 9/1966 | Schuman | 29/159.2 X |
| 3,673,837 | 7/1972 | Tixier | 29/159.2 X |
| 3,813,718 | 6/1974 | Kamiya | 10/10 R |

FOREIGN PATENTS OR APPLICATIONS
| | | | |
|---|---|---|---|
| 508,235 | 12/1954 | Canada | 29/159.2 |

*Primary Examiner*—C. W. Lanham
*Assistant Examiner*—Victor A. DiPalma
*Attorney, Agent, or Firm*—Littlepage, Quaintance, Murphy & Dobyns

[57] ABSTRACT

Manufacturing process for a rolled gear characterized in that before rolling a gear, a space is cut on the gear material in the direction of the tooth profile surface at the pitch of a gear to be produced and then the rolling die is pressed and rolled against the gear material, thereby forming a water drop-like gap in the tooth profile.

7 Claims, 13 Drawing Figures

MANUFACTURING PROCESS OF A ROLLED GEAR

CROSS REFERENCE TO RELATED APPLICATION

This application is an improvement of application Ser. No. 363,597 filed May 24, 1973, for "Method of Manufacturing Roll Threaded Screws having Elasticity," now U.S. Pat. No. 3,813,718.

BACKGROUND OF THE INVENTION

In a gear mechanism it is theoretically possible but in reality impossible for a series of gears with same module and pitch to perfectly mesh with one another. In actual practice gears are subject to various manufacturing errors such as pitch error, profile error or eccentricity; they are expanded through temperature rise in operation or deformed by stress under load and there can be no gears which are in a perfect state of meshing. Therefore it is common practice to provide a backlash between two gears, thereby avoiding abnormal meshing. This results in continuous changes in the angular velocity of gear rotation, noise in high speed rotation and failure to transmit power smoothly.

When it comes to the gear strength, it is extremely difficult to make an exact calculation of the gear strength and it is common practice to find an approximate value of it using a simple empirical formula, the factors considered thereby being (1) bending strength, (2) strength in terms of wear and (3) strength in terms of surface pressure. For evaluation of the bending strength, the Lewis calculation formula is commonly applied by assuming the worst condition of the force (shown in FIG. 1 acting in the arrow direction W) concentrated at the tip of a single tooth of the gear and acting uniformly over the face width. It is obvious that the weakest point of the gear lies along the line X; and in some cases this portion is strengthened through improvement of tooth profile.

As for the strength in terms of wear, it goes without saying that a gear in common machines which runs for many hours becomes worn. If the gear is not wear-resistant, the gear contact becomes slack, leading to a substantial reduction of gear strength.

Some gears are made wear-resistant, while other gears are surface-hardened. In the rolled gear of the present invention the tooth profile is generated through plastic deformation of the gear material. Its wear resistance is extremely great, due to its elasticity thus assuring a high value of gear strength in terms of wear.

As for the strength in terms of surface pressure, which is expressed by Buckingham's calculation formula, the gear of the present invention, on account of its tooth surface being rigid yet elastic, is superior also in this strength.

As described above, the gear strength depends upon various factors and many proposals were made for improvement of the strength but few of them have been practically adopted.

An elastic gear is one of such proposals. When fabricated of a relatively elastic material such as laminated wood, bakelite or nonferrous metal like aluminum and bronze, it permits a certain elastic deformation even in the state of meshing, thereby preventing noise and assuring the best transmission of power; but it finds little application because of its low strength and short life due to its material quality. The present practice of gear cutting which is mainly done using a hobbing machine a pinion cutter or a forming tool is expected in the near future to be superseded by the rolling herein described aimed at higher accuracy and mass production, just as in the roll-threading of screws.

DESCRIPTION OF THE INVENTION

The present invention relates to a gear-rolling process applicable to any kind of gear material which aims at structurally imparting elasticity to gears. An outline of the process is as follows: The gear material to be rolled is preliminarily cut to create a space running along the profile surface at the gear pitch; the rolling die is pressed to roll against the gear material and thereby a water drop-like gap is formed on one part of the profile.

Figure 1:
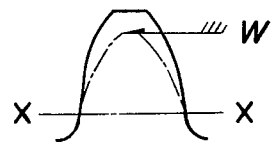
FIG. 1 illustrates a force acting on a single tooth of the gear.
Figure 2:
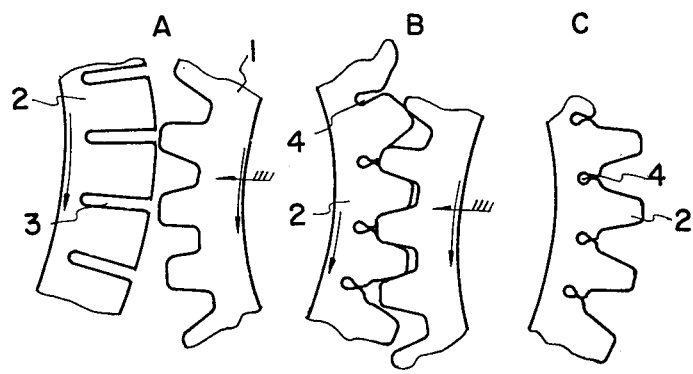
FIGS. 2 A – C illustrate the process of forming a gap at the bottom land of a gear according to the present invention.

To explain in detail referring to the drawings, when a water drop-like gap is to be formed at the bottom land of the tooth profile, a space 3 of identical pitch is cut on the material 2 using an appropriate tool such as a cutter or a milling machine at a position corresponding to the central axis of the profile of the rolling die 1 as shown in FIGS. 2 A – C. The rolling die 1 is then pressed against the material 2 and rolled in the arrow direction at the same speed as the material 2.

Thus, as illustrated in FIG. 2 B, the material 2 is plastically in the space 3 by the rolling die, whereby the space of the opening except for a narrow gap is filled up. With further progress of work, as illustrated in FIG. 2 C, a rolled tooth profile with a water drop-like gap 4 formed at the bottom land can be obtained.

Formation of a water drop-like gap at the bottom land of the tooth profile according to the present invention was predicted to cause a large drop in strength and durability just as in the common long tooth gear. In this invention since the water drop-like gap is formed through plastic deformation of rolling, the stress distribution of the gap wall is so good and the material quality is made so strong by rolling that the gear strength is hardly affected.

Figure 3:
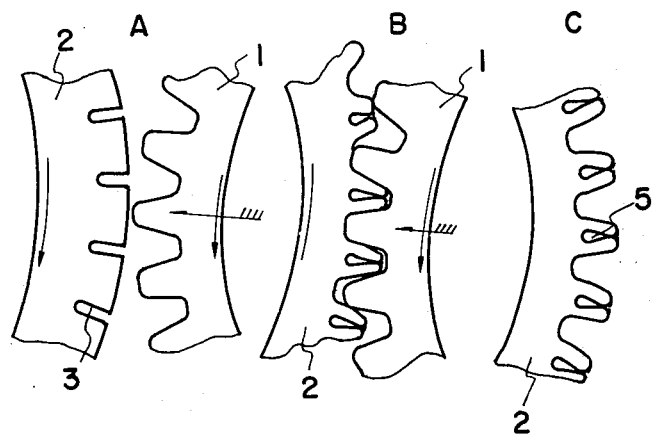
FIGS. 3 A – C illustrate the process of forming a gap at the top of a gear according to the present invention.

When the water drop-like gap is to be formed on the gear top, similarly to the above, as illustrated in FIGS. 3 A – C, a space 3 is cut on the periphery of the gear material 2 corresponding to the bottom land of profile in the rolling die 1. Said rolling die is pressed against the gear material and rolled, whereby, as shown in FIG. 3 B, the gear material suffers plastic deformation and as a consequence, as shown in FIG. 3 C, a gear is produced with a water drop-like gap 5 formed at the tooth top. Needless to say, the point of contact with the rolling die can be taken at a position other than illustrated in the embodiment.

Figure 6:
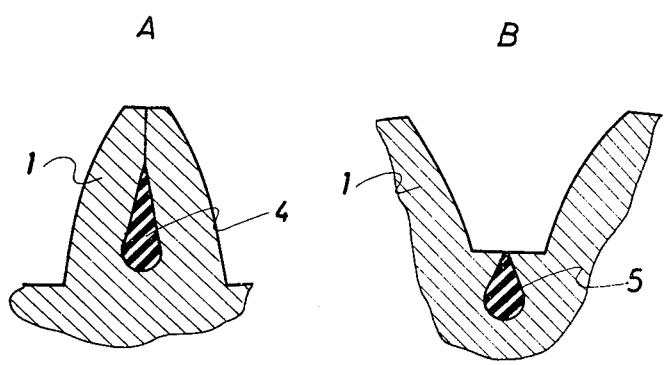
FIGS. 6 A, B show the tooth formed with a respective closed space, which is filled with plastic material.

When the space cut on the gear material is filled with plastics and then the die is rolled against the gear material, plastics can go into the water drop-like gap, as shown in FIG. 6.

It should be noted in this gear manufacturing process the preliminary cutting of a space on the material highly facilitates plastic deformation of the material, which in turn reduces the rolling pressure and enables cold-working of a large gear, which has heretofore been deemed impossible.

Figure 4:
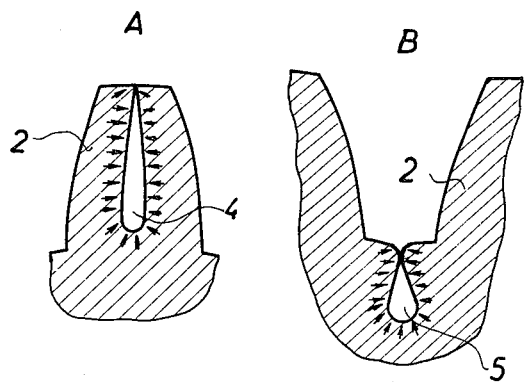
FIGS. 4 A, B are enlarged views of a gear provided with a water drop-like gap.

FIGS. 4 A, B are enlarged views showing a profile with a water drop-like gap at the top and bottom respectively. As shown by the arrow, this gap, which results from plastic deformation of a preliminarily cut space, has the cross section of a water drop which is free from any local stress concentration and accordingly it has hardly anything to do with the strength of the profile itself. The space to be cut on the gear material, which should vary depending on the gear profile, gear material or intended use of gear, cannot be standardized, but the experimental data suggest that good results will be obtained, if the depth of the space is equal to the maximum tooth depth when it is cut at the profile top and if the depth of the space is equal to half the tooth depth when it is cut at the profile bottom.

Figure 5:
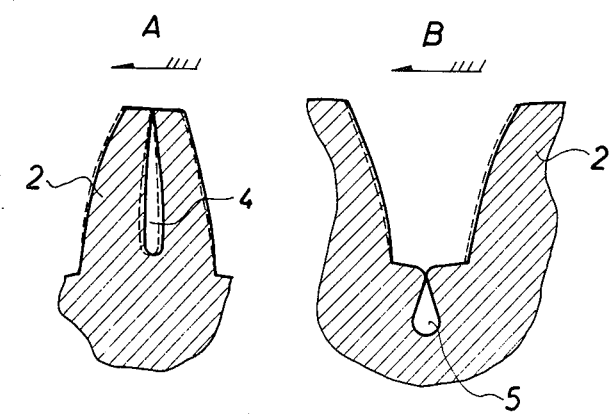
FIGS. 5 A, B illustrate a deformed state of a gear tooth with a gap therein when an external force acts on it.

The most important thing in this invention is that this tooth profile, as compared with the conventional one, is extremely elastic. A meshing of elastic profiles enables a gear combination of small backlash. In FIG. 5 A where the profile top has a water drop-like gap, the side walls of the gap constitute separate elastic walls which are slightly displaced under load as indicated by a dotted line, thereby enlarging and stabilizing the contact surface and equalizing the load. In FIG. 5 B too where the profile bottom has a water drop-like gap, similarly the profile becomes a comb-like, long one which is displaced under load as indicated by a dotted line, thereby widening the contact area and preventing local concentration of load.

As described above, the present invention can simply give, without detracting from the strength of system, a gear system which can best transmit power with little backlash and quiet running. It can mass-produce at low cost an elastic, rolled gear with the greatest accuracy from any material.

What is claimed is:

1. Manufacturing process of a rolled gear, comprising a step of cutting preliminarily spaces on the periphery of the gear material in the profile direction at a pitch of a gear to be produced; and a step of pressing and rolling a rolling die against said gear material, thereby forming a water drop-like gap on each part of the tooth profile.

2. Manufacturing process of a rolled gear of claim 1, characterized in that the tip of the rolling die is applied to the peripheral faces between the spaces.

3. Manufacturing process of a rolled gear of claim 1, characterized in that the tip of the rolling die is applied onto the spaces.

4. Manufacturing process of a rolled gear of claim 1, characterized in that the tip of the rolling die is applied to the center of the faces between the spaces.

5. Manufacturing process of a rolled gear of claim 1, characterized in that the spaces are filled with plastics prior to rolling.

6. A method of manufacturing a rolled gear having an elastic tooth profile comprising the steps of forming spaces on the periphery of the gear material at a pitch consistent with that of the gear to be produced, and forcing a rolling dye against said gear material with a force sufficient to deform the gear material and form a water drop-like gap in a portion of the tooth profile.

7. A method of manufacturing a rolled gear having an elastic tooth profile comprising the steps of forming a plurality of spaces on the periphery of the gear material at a pitch and in a profile direction consistent with that of the gear to be produced, and pressing and rolling a rolling dye against the peripheral faces between said spaces in said gear material with a force sufficient to plastically deform the gear material and form a water drop-like gap in the top of each gear tooth.

* * * * *

UNITED STATES PATENT OFFICE
CERTIFICATE OF CORRECTION

PATENT NO. : 3,887,979
DATED : June 10, 1975
INVENTOR(S) : MINORU KAMIYA

It is certified that error appears in the above-identified patent and that said Letters Patent are hereby corrected as shown below:

Column 1, line 63, after "preventing", should read

--noise and as- --.

Signed and Sealed this second Day of September 1975

[SEAL]

Attest:

RUTH C. MASON
Attesting Officer

C. MARSHALL DANN
Commissioner of Patents and Trademarks